United States Patent Office 3,445,473
Patented May 20, 1969

3,445,473
3-ANILINO-THIOPHENE-4-CARBOXYLIC ACIDS,
ESTERS, AND AMIDES
Heinrich Ruschig, Bad Soden, Taunus, Willi Meixner,
Hofheim, Taunus, and Hans Georg Alpermann, Kelkheim, Taunus, Germany, assignors to Farbwerke
Hoechst Aktiengesellschaft vormals Meister Lucius &
Bruning, Frankfurt am Main, Germany, a corporation
of Germany
No Drawing. Filed Mar. 30, 1966, Ser. No. 538,569
Claims priority, application Germany, Apr. 10, 1965,
45,788
Int. Cl. C07d 63/16, 99/06; A61k 27/00
U.S. Cl. 260—293.4
12 Claims

ABSTRACT OF THE DISCLOSURE 3-anilinothiophenes substituted in the anilino ring by halogen, trifluoromethyl, lower alkyl, lower alkoxy, phenyl-lower alkoxy, halophenyl-lower alkoxy, lower alkyl phenyl-lower alkoxy, lower alkoxyphenyl-lower alkoxy, cycloalkyl of 5 to 6 carbon atoms, or by an annulated alicyclic ring of 3–4 carbon atoms and in the 4-position by a carboxyl, carbonamide or a carboxylic acid ester group containing, in the ester grouping, a lower alkyl radical, a di-lower alkyl-amino-lower alkyl radical or an alkyleneimino-lower alkyl radical having 4–5 ring carbon atoms which may be interrupted by oxygen or the group $>N-CH_3$ These compounds and the physiologically tolerable salts thereof antiphlogistic and antipyretic properties.

---

The present invention provides aminothiophene derivatives of the Formula I

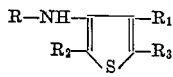

(I)

and their salts.

In the above Formula I

R represents a phenyl radical carrying one or several substituents which may be halogen, trifluoromethyl, lower alkyl or lower alkoxy, phenyl-lower alkoxy which may be substituted in the phenyl nucleus by halogen, lower alkyl or lower alkoxy, or cycloalkyl having 5–6 carbon atoms, and wherein 2 adjacent substituents may be members of an annulated alicyclic ring system of 3–4 carbon atoms, $R_1$ represents a carboxyl, carbonamide or carboxylic acid ester group containing in the ester grouping (a) A lower alkyl radical, a di-lower alkyl-amino-lower alkyl radical or an alkylene-imine-lower alkyl radical having 4–5 ring carbon atoms which may be interrupted by oxygen or the group $>N-CH$, or (b) A phenyl radical which may be substituted by halogen, lower alkyl or lower alkoxy, or (c) A phenyl-lower alkyl radical, and $R_2$ and $R_3$ represent hydrogen or lower alkyl.

The present invention also provides for the manufacture of the above-identified aminothiophene derivatives. The said compounds can be prepared according to the following methods:

(a) A thiophanone of the Formula II

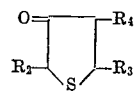

(II)

wherein $R_2$ and $R_3$ have the meanings given above and $R_4$ has the meanings of $R_1$ or stands for a cyano group, is condensed with a compound of the formula $R-NH_2$ to yield the corresponding derivative of 3-amino-2,5-dihydro-thiophene, the product is dehydrogenated in known manner and, in case the radical $R_4$ contains a cyano group, this group is converted in known manner into one of the radicals represented by $R_1$;

(b) A thiophene derivative of the Formula III

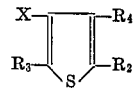

(III)

which may be partially or completely hydrogenated, is condensed with a compound of the Formula IV $$R-Y \qquad (IV)$$

wherein $R_2$, $R_3$ and $R_4$ are defined as above and one of the radicals X and Y stand for an amino group and the other for a halogen atom, the product is dehydrogenated if necessary, and/or if the radical $R_4$ contains a cyano group, this group is converted into one of the radicals represented by $R_1$;

(c) A compound of the Formula V

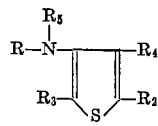

which may be partially or completely hydrogenated and wherein R, $R_2$, $R_3$, and $R_4$ are defined as above and $R_5$ stands for the radical of an organic acid, is de-acylated, the product is dehydrogenated if necessary, and/or in case the radical $R_4$ contains a cyano group, this group is converted into one of the radicals represented by $R_1$; and carboxyl functions $R_1$ which may be present in the final products may be converted into other functions designated by $R_1$. If desired, the free compounds may be converted into salts or the salts may be converted into the free compounds.

(a) As starting substances suitable for use in variant (a) of the process of the present invention, there may be used, for example, the following thiophanones which correspond to the indicated Formula II:

4-cyano-thiophanone-(3), 2- or 5-methyl-4-cyano-thiophanone-(3), 2,5-dimethyl-4-cyano-thiophanone-(3), 2- or 5-ethyl-4-cyano-thiophanone-(3), 2-ethyl-5-methyl-4-cyano-thiophanone-(3), 2 - methyl - 5 - ethyl-4-cyano-thiophanone-(3), 5-propyl-4-cyanothiophanone - (3), 2-methyl-5-butyl - 4 - cyano-thiophanone-(3), wherein the cyano group may also be replaced by the carboxyl or carboxylate radical, carbalkoxy, carbaralkoxy or carbonamido radical, preferably containing a lower alkyl or alkylene radical in the ester group.

The starting substances are obtained in known manner by reaction of $\alpha,\beta$-unsaturated carboxylic acids, -esters, -amides or -nitriles with thioglycolic acid ester, which may be substituted by alkyl.

As compounds of the formula $R-NH_2$ which may be used for the condensation with the thiophanones in question, there may be mentioned, for example, the following compounds:

2- or 3- or 4-chloro-, -fluoro-, -bromo-, -iodo-, -methyl-, -ethyl-, -propyl- or -butyl-aniline, 2,6-dichloro-aniline, 2,6-, 2,4-, 2,5-, 2,3-, or 34-dimethyl-aniline, 2,3,6-trimethyl-aniline, 2-methyl-3-ethyl- -propyl- or -butyl-aniline, 2-chloro-6-methyl-, -ethyl- or -propyl-aniline, 2,6-dichloro-3-methyl-aniline, 2-, 3- or 4-trifluoromethyl-aniline, 2 - methoxy-aniline, 3,4 - dimethoxy-aniline, 2-methyl - 6 - methoxy-, -ethoxy-, -propoxy- or -but—oxy-aniline, 2- or 4-ethoxy- or -benzoyloxy-aniline, 3-($\beta$-phenyl-ethoxy)-aniline, 2- or 4-cyclopentyl- or -cyclohexyl-aniline, 2 - methyl - 4 - cyclohexyl-aniline, 2,5 - dimethoxy- or -diethoxy-4-chloro-aniline, 1- or 2-amino-5,6,7,8-tetrahydro-naphthalene, 4- or 5-amino-indane.

The reaction of the thiophanones of the Formula II with the anilines of the formula R—NH₂ can be carried out by heating in the presence or in the absence of a solvent, suitably with the use of a catalyst such as benzenesulfonic acid or toluenesulfonic acid, alkali metal or alkaline earth metal ions or an ion exchanger. Suitable solvents are, for example, benzene, chlorobenzene, toluene, xylene, dimethylformamide or dichloroethane. The reaction may also be carried out in the presence of glacial acetic acid at the temperature of a steam bath. In this case it is not necessary to use a proper solvent. When proceeding in this manner, there are obtained the corresponding 2,5-dihydro-thiophene derivatives. These products can be converted by usual dehydrogenation methods, for example, by the reaction with an oxidizing agent such as tetrachloro-quinone, into the thiophene derivatives of the Formula I which may contain, instead of the carboxyl group, a radical capable of being converted into a carboxyl group. The conversion of radicals such as cyano, ester or amido groups into the carboxyl group is generally known and complies with the usual practice.

(b) The starting substances of the Formula III differ from the compounds of the Formula II in that they may be partially or completely saturated and contain chlorine, bromine, iodine or the amino group instead of the carbonyl oxygen.

Suitable starting components of the Formula IV are the above-mentioned compounds of the formula R—NH₂ or substances which contain chlorine, bromine or iodine instead of the NH₂-group.

The condensation of compounds of the Formula III with halogeno-benzene- or aniline-derivatives of the Formula IV is likewise generally known and preferably carried out in the presence of cupriferous catalysts and basic reactants which are commonly used as acceptors of hydrogen halide, e.g. alkali metal or alkaline earth metal carbonates or carboxylates or tertiary organic amines such as N,N-dimethyl-aniline. It is possible to operate in the presence or in the absence of an inert solvent, and preferably at a temperature within the range from 100 to 250° C.

(c) The compounds of the Formula V which are suitable as starting substances for variant c) are combinations of the above-mentioned components III and IV and carry at the nitrogen atom an additional radical of an organic acid, preferably the radical of benzoic acid, but there may also be used substituted benzoic and alkane acids. Such N-benzoyl derivatives can be obtained in known manner and are in most cases well crystallized products. The de-acylation can be carried out in an acid or alkaline medium. Any carboxyl functions which may be present can be converted into the carboxyl group or into a corresponding salt either before, during or after the de-acylation. A preferred process consists in heating the N-acyl compound to the boil with an excess of alkali metal hydroxide and alcohol favoring the formation of a homogeneous reaction mixture until not only the acyl radical is split off but also the carboxyl function is present in the form of a carboxylate anion.

The reaction products are usually purified by recrystallization or by treatment with solvents having a selective dissolving power for impurities or by-product which may be present. Free carboxylic acids may also be purified by dissolving them in an aqueous alkali and separating them from undesired products by fractional precipitation.

For therapeutical purposes there may be used the free acids as well as the salts of the acids with mineral or organic bases, for example, alkali metal or alkaline earth metal hydroxides, carbonates or bicarbonates, trimethylamine or dimethylamino-ethanol. Basic esters may also be used in the form of their salts with mineral or organic acids, for example, as halides, sulfates or acetates. If desired, they may be worked up with other active substances and/or galenic adjuvants to the usual preparations such as tablets, dragées, solutions, suppositories, ointments, powders, and the like. Esters and amides may be used for preparations having a prolonged period of activity.

The products of the present invention are distinguished in particular, by good antiphlogistic and antipyretic properties. For example, 3-(2',3'-dimethyl-anilino)-thiophenecarboxylic acid-(4) shows in the edema test in the rat's paw, upon oral administration of 150 mg./kg., a strong antiphlogistic action which is comparable to the action of 150 mg./kg. of phenylbutazone. The antiphlogistic action can also be observed clearly in the UV-erythema test in guinea pigs where a dose of 12.5 mg./kg. of the above-indicated compound, applied orally, inhibits the formation of erythema to the same extent as 12.5 mg./kg. of phenylbutazone. The known dimethyl-aminophenazone shows the same action only upon administration of 150 mg./kg. In contradistinction to the known compounds, 3-(2',3'-dimethylanilino)-thiophene-carboxylic acid-(4) offers another essential advantage: administered subcutaneously to the rabbit in a dose of 10 mg./kg. it shows the same antipyretic activity as 25 mg./kg. of dimethyl-aminophenazone administered subcutaneously, whereas in the same test 100 mg./kg. of phenylbutazone show practically no antipyretic action. The acute toxicity of the compounds of the present invention is relatively low and similar in order of value to the toxicity of the comparable substances mentioned, even rather more favorable than the toxicity of these substances which have occupied for years a leading position in therapeutics.

The following examples illustrate the invention, but they are not intended to limit it thereto:

Example 1

(a) 3-(3'-trifluoromethyl-anilino)-thiophene-carboxylic acid-(4).—152 grams of 3-(3'-trifluoromethyl-anilino)-4-cyanothiophene are dissolved in 80 milliliters of methanol and the solution is saturated with HCl gas at 10° C. The reaction product crystallizes slowly. After having been allowed to stand for 3 days, the content of the flask is dissolved in 2 liters of ethyl acetate. This solution is washed 4 times with ice water and dried over Na₂SO₄; the solvent is then removed by distillation. As residue, there remain behind 193 grams.

The residue is boiled for 4 hours under reflux in a solution of 213 grams of NaOH, 800 milliliters of water and 300 milliliters of methanol. The methanol is removed by distillation in a water jet vacuum, the aqueous solution is diluted with 1 liter of water, clarified over charcoal and then acidified with dilute hydrochloric acid. The product that has precipitated is filtered with suction, washed with water and dried. The yield of 3-(3-trifluoromethyl-anilino)-thiophene-carboxylic acid-(4) is 90 grams; melting point: 174° C. (decomposition). After two recrystallizations from alcohol, the melting point is at 178° C. (decomposition).

In analogous manner, there are obtained with the use of corresponding cyano-thiophenes:

(b) 3-(2',3'-dimethyl-anilino) - thiophene - carboxylic acid-(4), melting point 142° C. (decomp.).—The same compound is obtained by heating to 120° C. 3-(2',3'-dimethyl-anilino)-4-cyano-thiophene with aqueous-methanolic potassium hydroxide solution in a closed vessel until a sample of the reaction mixture gives a clear solution upon dilution with water and by isolating the free carboxylic acid in the manner described above.

(c) 3-(2',6'-dichloro-anilino) - thiophene - carboxylic acid-(4), melting point 194° C. (decomp.);

(d) 3-(2'-chloro-6'-methyl-anilino)-thiopene-carboxylic acid-(4), yield 49%, melting point 177° C. (decomp.);

(e) 3-(2',6'-dimethyl - anilino) - thiophene - carboxylic acid-(4), yield 47%, melting point 169° C. (decomp.);

(f) 3-(4'-isopropyl-anilino)-thiophene-carboxylic acid-(4), yield 55%, melting point 159° C. (decomp.);

(g) 3-(4'-ethoxy-anilino)-thiophene-carboxylic acid-(4), yield 54%, melting point 149° C. (decomp.);

(h) 3-(2',4',6'-trimethyl-anilino)-thiophene-carboxylic acid-(4), yield 58%, melting point 177° C. (decomp.);

(i) 3-(3',4'-dimethyl-anilino)-thiophene-carboxylic acid-(4), yield 62%, melting point 151° C. (decomp.);

(j) 3-(2'-chloro-anilino)-thiophene-carboxylic acid-(4), yield 68%, melting point 198° C. (decomp.);

(k) 3-(2',4',6'-trichloro-anilino)-thiophene-carboxylic acid-(4), yield 45%, melting point 224° C. (decomp.);

(l) 3-(2',3'-dichloro-anilino)-thiophene-carboxylic acid-(4), yield 68%, melting point 264° C. (decomp.);

(m) 3-(2'-chloro-5'-methyl-anilino)-thiophene-carboxylic acid-(4), yield 61%, melting point 165° C. (decomp.);

(n) 3-(2',4',6'-trichloro-5'-methyl-anilino)-thiophene-carboxylic acid-(4), yield 49%, melting point 223° C. (decomp.);

(o) 3-(2'-chloro-3'-methyl-anilino)-thiophene-carboxylic acid-(4), yield 51%, melting point 184° C. (decomp.);

(p) 3-(2',4'-dichloro-3'-methyl-anilino)-thiophene-carboxylic acid-(4), yield 56%, melting point 246° C. (decomp.);

(q) 3-(2',6'-dichloro-4'-ethoxy-5'-methyl-anilino)-thiophene-carboxylic acid-(4), yield 52%, melting point 225° C. (decomp.);

(r) 3-(2',6'-dichloro-4'-ethoxy-anilino)-thiophene-carboxylic acid-(4), yield 49%, melting point 225° C. (decomp.);

(s) 3-(2',4'-dichloro-5'-methyl-anilino)-thiophene-carboxylic acid-(4), yield 42%, melting point 264° C. (decomp.).

The 4-cyano-thiophenes used as starting substances for the process of the present invention are obtained by reaction of 4-cyano-thiophanone with R-substituted anilines and following dehydrogenation of the 4-cyano-2,5-dihydro-thiophenes formed. The individual reaction steps are described here.

I. Preparation of 4-cyano-thiophanone 216 grams of acrylonitrile and 430 grams of thioglycolic acid methyl esters are mixed and introduced dropwise into a fresh solution of methanolic Na-alcoholate, prepared from 132 grams of sodium in 1.44 liter of methanol, at 20° C. The solution is heated for 1 hour under reflux, cooled and the sodium enolate is allowed to crystallize over night. The salt which has been filtered off with suction is introduced into a separating funnel, covered with ether and acidified with 2N sulfuric acid. The layer of ether is separated and the aqueous phase is shaken twice with ether and the combined ether solutions are evaporated after having been dried over Na$_2$SO$_4$; residue 300 grams. The 4-cyano-thiophanone-(3)- is recrystallized from a mixture of benzene and isopropyl ether. Yield 250 grams, melting point 72° C.

II. Preparation of 4-cyano-2.5-dihydro-thiophenes (a) 3-(3'-trifluoromethyl-anilino)-4-cyano-2,5-dihydro-thiophene.—86 grams of 4-cyano-thiophanone-(3), 120 grams of 3-trifluoromethyl-aniline and 4 milliliters of glacial acetic acid are heated for 3 hours on the steam bath. The 3-(3'-trifluoromethyl-anilino)-4-cyano-2,5-dihydro-thiophene which has crystallized is recrystallized from isopropyl alcohol. Yield: 161 grams, melting point 141° C.

In analogous manner there are obtained:

(b) 3-(2',3'-dimethyl-anilino)-4-cyano-2,5-dihydro-thiophene, melting point 132° C.;

(c) 3-(2',6'-dichloro-anilino)-4-cyano-2,5-dihydro-thiophene, melting point 172° C.

81 grams of 2,6-dichloro-aniline and 63 grams of 4-cyano-thiophanone-(3) are boiled for 4 hours with 1 gram of p-toluene-sulfonic acid in 400 milliliters of toluene on a water separator, whereby about 8 milliliters of water are separated. 200 milliliters of toluene are then separated by distillation, the reaction solution is filtered hot with charcoal, the substance which has crystallized is filtered with suction after cooling and dried. Yield: 96 grams; melting point 172° C.

In analogous manner, there are obtained:

(d) 3-(2'-chloro-6'-methyl-anilino)-4-cyano-2,5-dihydro-thiophene, melting point 160° C.;

(e) 3-(2',6'-dimethyl-anilino)-4-cyano-2,5-dihydro-thiophene, melting point 157° C.;

(f) 3-(4'-isopropyl-anilino)-4-cyano-2,5-dihydro-thiophene, melting point 136° C.;

(g) 3-(4'-ethoxy-anilino)-4-cyano-2,5-dihydro-thiophene, melting point 139° C.;

(h) 3-(2',4',6'-trimethyl-anilino)-4-cyano-2,5-dihydro-thiophene, melting point 172° C.;

(i) 3-(3',4'-dimethyl-anilino)-4-cyano-2,5-dihydro-thiophene, melting point 147° C.;

(j) 3-(2'-chloro-anilino)-4-cyano-2,5-dihydro-thiophene, melting point 125° C.;

(k) 3-(2',4',6'-trichloro-anilino)-4-cyano-2,5-dihydro-thiophene, melting point 136° C.;

(l) 3-(2',3'-dichloro-anilino)-4-cyano-2,5-dihydro-thiophene, melting poiint 143° C.;

(m) 3-(2'-chloro-5'-methyl-anilino)-4-cyano-2,5-dihydrothiophene, melting point 118° C.;

(n) 3-(2',4',6'-trichloro-5'-methyl-anilino)-4-cyano-2,5-dihydro-thiophene, melting point 148° C.;

(o) 3-(2'-chloro-3'-methyl-anilino)-4-cyano-2,5-dihydro-thiophene, melting point 141° C.;

(p) 3-(2',4'-dichloro-3'-methyl-anilino)-4-cyano-2,5-dihydro-thiophene, melting point 154° C.;

(q) 3-(2',6'-dichloro-4'-ethoxy-5'-methyl-anilino)-4-cyano-2,5-dihydro-thiophene, melting point 173° C.;

(r) 3-(2',6'-dichloro-4'-ethoxy-anilino)-4-cyano-2,5-dihydro-thiophene, melting point 163° C.;

(s) 3-(2',4'-dichloro-5'-methyl-anilino)-4-cyano-2,5-dihydro-thiophene, melting point 142° C.

III. Preparation of 4-cyano-thiophenes (a) 3-(3'-trifluoromethyl-anilino)-4-cyano-thiophene.—161 grams of 3-(3'-trifluoromethyl-anilino)-4-cyano-2,5-dihydro-thiophene are boiled with 149 grams of tetrachloroquinone in 1.5 liter of xylene for 4 hours on a reflux cooler. The tetrachlorohydroquinone crystallizes. The precipitate is filtered with suction and washed with ether. The xylene/ether solution is washed with dilute sodium hydroxide solution, with Na-dithionite solution and with water. The solution is dried over Na$_2$SO$_4$. After having removed the solvent by distillation, the residue is crystallized from hexahydrobenzene. Yield: 152 grams, melting point 70° C.

In analogous manner and with the use of the compounds prepared according to II(b) to II(s), there are obtained:

(b) 3-(2',3'-dimethyl-anilino)-4-cyano-thiophene, melting point 77° C.;

(c) 3-(2',6'-dichloro-anilino)-4-cyano-thiophene, melting point 107° C.;

(d) 3-(2,-chloro-6'-methyl-anilino)-4-cyano-thiophene, melting point 96° C.;

(e) 3-(2',6'-dimethyl-anilino)-4-cyano-thiophene, melting point 104° C.;

(f) 3-(4'-isopropyl-anilino)-4-cyano-thiophene, melting point 124° C.;

(g) 3-(4'-ethoxy-anilino)-4-cyano-thiophene, melting point 126° C.;

(h) 3-(2',4',6'-trimethyl-anilino)-4-cyano-thiophene, melting point 114° C.;

(i) 3-(3',4'-dimethyl-anilino)-4-cyano-thiophene, melting point 78° C.;

(j) 3-(2'-chloro-anilino)-4-cyano-thiophene, melting point 69° C.;

(k) 3 - (2',4',6' - trichloro - anilino) - 4 - cyano - thiophene, melting point 135° C.;

(l) 3 - (2',3' - dichloro - anilino) - 4 - cyano - thiophene, melting point 162° C.;

(m) 3 - (2' - chloro - 5' - methyl - anilino) - 4 - cyano-thiophene, melting point 112° C.;

(n) 3 - (2',4',6' - trichloro - 5' - methyl - anilino) - 4-cyano-thiophene, melting point 118° C.;

(o) 3 - (2' - chloro - 3' - methyl - anilino) - 4 - cyano-thiophene, melting point 125° C.;

(p) 3 - (2',4' - dichloro - 3' - methyl - anilino) - 4-cyano-thiophene, melting point 124° C.;

(q) 3 - (2',6' - dichloro - 4' - ethoxy - 5' - methylanilino)-4-cyano-thiophene, melting point 136° C.;

(r) 3 - (2',6' - dichloro - 4' - ethoxy - anilino) - 4-cyano-thiophene, melting point 113° C.;

(s) 3 - (2',4' - dichloro - 5' - methyl - anilino) - 4-cyano-thiophene, melting point 157° C.

Example 2

3 - (2',6' - dichloro - anilino) - thiophene - 4 - carboxylic acid ethyl ester.—31.1 grams of the sodium salt of 3 - (2',6' - dichloro - anilino) - thiophene - 4 - carboxylic acid in 300 milliliters of dimethylformamide are heated with 30 grams of ethyl iodide for 2 hours under reflux. The solvent is then removed by distillation in a water jet vacuum and the residue is taken up in water and chloroform. The chloroform phase is separated, washed with water and dried over sodium sulfate. After removal of the solvent by distillation, the product is recrystallized from ethanol. Yield: 23 grams, melting point 68° C.

Example 3

3 - (2',6' - dichloro - anilino) - thiophene - 4 - carboxylic acid - (β - diethylamino - ethyl ester) - hydrochloride.—31.1 grams of the sodium salt of 3-(2',6'-dichloroanilino)-thiophene-4-carboxylic acid and 300 milliliters of toluene are heated to the boil while stirring and 16 grams of diethyl-amino-ethyl chloride in 40 milliliters of toluene are added dropwise. Heating is continued for 3 hours. After cooling, the toluene solution is washed with water. Upon shaking of the toluene phase with dilute hydrochloric acid the hydrochloride of the ester crystallizes; it is filtered with suction, washed with alcohol and dried. Yield: 27 grams; melting point 198° C. (from ethanol).

In analogous manner and with the use of β-piperidino-ethyl chloride, there are obtained:

3 - (2',6' - dichloro - anilino) - thiophene - 4 - carboxylic acid - (β - piperidino - ethyl ester) - hydrochloride, melting point 248° C.; and with the use of β-diethyl-aminoethyl chloride and the sodium salt of 3-(2'-chloroanilino) - thiophene - 4 - carboxylic acid the 3 - (2'-chloro - anilino) - thiophene - 4 - carboxylic acid - (β-diethylamino-ethyl ester)-hydrochloride, melting point 154° C.

Example 4

3 - (2' - chloro - 3' - methyl - anilino) - thiophene - 4-carboxylic acid-amide.—A solution of 140 grams of 3-(2' - chloro - 3' - methyl - anilino) - 4 - cyano - thiophene in 100 milliliters of methanol is saturated at 5 to 10° C. with hydrogen chloride. After having been allowed to stand for 3 days, the content of the flask is dissolved in ethyl acetate. The solution is washed several times with ice water, dried over sodium sulfate and evaporated. 114 grams of the amide, melting at 133° C. (from isopropyl ether), are obtained.

We claim:
1. A compound of the formula

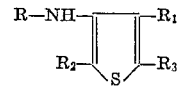

wherein

R stands for phenyl substituted by halogen, trifluoromethyl, lower alkyl, lower alkoxy, phenyl-lower alkoxy, or cycloalkyl of 5 to 6 carbon atoms, or for 5,6,7,8-tetrahydronaphthyl-1 or -2, or for 4- or 5-indanyl;

$R_1$ stands for a carboxyl, carbonamide, or carboxylic acid ester group containing in the ester grouping a lower alkyl radical, a di-lower alkyl-amino-lower alkyl radical or a B-piperidino ethyl radical; and $R_2$ and $R_3$ stand for hydrogen or lower alkyl; or a physiologically tolerable salt thereof.

2. 3 - (3' - trifluoromethyl - anilino) - 4 - carboxy-thiophene or a physiologically-tolerable salt thereof.

3. 3 - (2',3' - dimethylanilino) - 4 - carboxy - thiophene or a physiologically-tolerable salt thereof.

4. 3 - (2',6' - dichloroanilino) - 4 - carboxy - thiophene or a physiologically-tolerable salt thereof.

5. 3-(2'-chloro-6'-methyl-anilino)-4-carboxy-thiophene or a physiologically-tolerable salt thereof.

6. 3 - (2',6' - dimethylanilino) - 4 - carboxy - thiophene or a physiologically-tolerable salt thereof.

7. 3 - (3',4' - dimethyl - anilino) - thiophene - carboxylic acid-(4) or a physiologically-tolerable salt thereof.

8. 3 - (2',3' - dichloro - anilino) - thiophene - carboxylic acid-(4) or a physiologically-tolerable salt thereof.

9. 3 - (2',4',6' - trichloro - 5' - methyl - anilino) - thiophene-carboxylic acid-(4) or a physiologically-tolerable salt thereof.

10. 3 - (2' - chloro - 3' - methyl - anilino) - thiophene-carboxylic acid-(4) or a physiologically-tolerable salt thereof.

11. 3 - (2',4' - dichloro - 5' - methyl - anilino) - thiophene-carboxylic acid-(4) or a physiologically-tolerable salt thereof.

12. 3 - (2',6' - dichloro - anilino) - thiophene - 4 - carboxylic acid - (β - piperidino - ethyl - ester) - hydrochloride or a physiologically-tolerable salt thereof.

References Cited

UNITED STATES PATENTS 3,097,206  6/1963  Zirkle _____ 260—268

HENRY R. JILES, Primary Examiner.

C. M. SHURKO, Assistant Examiner.

U.S. Cl. X.R.

260—247.1, 326.3, 332.2, 332.3, 332.5, 561, 575, 612, 650, 651; 424—275